US008930847B2

(12) United States Patent
Jeong

(10) Patent No.: US 8,930,847 B2
(45) Date of Patent: Jan. 6, 2015

(54) METHOD FOR DISPLAYING WINDOWS

(75) Inventor: Seong Hun Jeong, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1061 days.

(21) Appl. No.: 12/687,910

(22) Filed: Jan. 15, 2010

(65) Prior Publication Data

US 2011/0099512 A1    Apr. 28, 2011

(30) Foreign Application Priority Data

Oct. 28, 2009   (KR) ........................ 10-2009-0103072

(51) Int. Cl.
*G06F 3/048*       (2013.01)
*G06F 9/44*        (2006.01)
*G06F 3/0481*      (2013.01)
*G06F 3/0488*      (2013.01)
*G09G 5/14*        (2006.01)

(52) U.S. Cl.
CPC .. G06F 3/04886 (2013.01); *G60F 2203/04803* (2013.01); *G09G 5/14* (2013.01); G06F 9/4443 (2013.01); G06F 3/0481 (2013.01)
USPC ........... 715/792; 715/781; 715/788; 715/790; 715/794; 715/796; 715/798; 715/800

(58) Field of Classification Search
CPC .............. G06F 3/0481; G06F 3/04886; G06F 2203/04803; G09G 5/14
USPC ......... 715/788, 790, 792, 781, 794, 796, 798, 715/800
See application file for complete search history.

(56) References Cited

U.S. PATENT DOCUMENTS

| | | | | |
|---|---|---|---|---|
| 5,390,295 A * | 2/1995 | Bates et al. | ................... | 715/789 |
| 5,487,143 A | 1/1996 | Southgate | | |
| 5,557,729 A * | 9/1996 | Frean | ............................. | 715/803 |
| 5,577,187 A * | 11/1996 | Mariani | ........................ | 715/792 |
| 5,712,995 A * | 1/1998 | Cohn | ............................. | 715/792 |
| 5,854,628 A * | 12/1998 | Nakagawa | ..................... | 715/803 |
| 5,925,103 A * | 7/1999 | Magallanes et al. | ........... | 709/230 |
| 6,008,809 A * | 12/1999 | Brooks | ........................... | 715/792 |
| 6,310,631 B1 * | 10/2001 | Cecco et al. | ................... | 715/792 |
| 6,573,913 B1 * | 6/2003 | Butler et al. | .................... | 715/761 |
| 6,639,606 B1 * | 10/2003 | Choi | ............................... | 715/700 |
| 6,661,436 B2 * | 12/2003 | Barksdale et al. | ............. | 715/788 |
| 7,036,089 B2 * | 4/2006 | Bauer | ............................ | 715/827 |
| 7,124,360 B1 * | 10/2006 | Drenttel et al. | ................ | 715/205 |
| 7,176,943 B2 * | 2/2007 | Meyers et al. | ................. | 345/619 |
| 7,403,211 B2 * | 7/2008 | Sheasby et al. | ................ | 345/661 |
| 7,636,899 B2 * | 12/2009 | Purcell et al. | .................. | 715/790 |
| 7,779,365 B2 * | 8/2010 | Fujita | ............................. | 715/788 |
| 2002/0089505 A1 * | 7/2002 | Ording | ........................... | 345/473 |
| 2002/0191028 A1 * | 12/2002 | Senechalle et al. | ............ | 345/800 |
| 2004/0066408 A1 * | 4/2004 | Meyers et al. | ................. | 345/764 |
| 2005/0146532 A1 * | 7/2005 | Miyazaki et al. | .............. | 345/600 |
| 2005/0160302 A1 * | 7/2005 | Asakura et al. | ................ | 713/320 |
| 2005/0188329 A1 * | 8/2005 | Cutler et al. | .................... | 715/804 |
| 2005/0257145 A1 * | 11/2005 | Gage | ............................. | 715/530 |
| 2007/0074110 A1 * | 3/2007 | Miksovsky et al. | ............ | 715/520 |
| 2007/0192726 A1 | 8/2007 | Kim et al. | | |

(Continued)

*Primary Examiner* — Patrick Riegler
(74) *Attorney, Agent, or Firm* — Fish & Richardson P.C.

(57) ABSTRACT

A method for displaying a plurality of windows includes dividing a display screen into first and second display areas. The plurality of windows may be rearranged in the first and second display areas and new windows may be displayed in the first and second display areas based on prior windows displayed.

15 Claims, 15 Drawing Sheets

(56) References Cited

U.S. PATENT DOCUMENTS

| | | | |
|---|---|---|---|
| 2008/0059571 A1* | 3/2008 | Khoo | 709/203 |
| 2008/0066006 A1* | 3/2008 | Kim | 715/781 |
| 2008/0115081 A1* | 5/2008 | Sankaravadivelu et al. | 715/783 |
| 2009/0096713 A1* | 4/2009 | Kim et al. | 345/2.2 |
| 2009/0150823 A1* | 6/2009 | Orr et al. | 715/788 |
| 2009/0199128 A1* | 8/2009 | Matthews et al. | 715/799 |
| 2009/0235203 A1* | 9/2009 | Iizuka | 715/800 |
| 2010/0066698 A1* | 3/2010 | Seo | 345/173 |

* cited by examiner

1100

1200

1400

1500

1600

1700

METHOD FOR DISPLAYING WINDOWS

CROSS-REFERENCE TO RELATED APPLICATIONS

The present application claims the benefit of priority under 35 U.S.C. 119 and 35 U.S.C. 365 to Korean Patent Application No. 10-2009-0103072 (filed on Oct. 28, 2009), which is hereby incorporated by reference in its entirety.

FIELD

This present disclosure relates to displaying windows.

BACKGROUND

Generally, dual display apparatuses for displaying dual windows have been used to output two or more individual windows.

SUMMARY

A method for arranging a display screen, which can divide the display screen into a plurality of display areas, and display operating windows of applications operated by a user on the divided display areas.

Implementations also provide an apparatus and a method for controlling a display screen, which can display a window on a position of a display area selected by a user.

Implementations also provide an apparatus and a method for controlling a display screen, which can arrange the latest displayed windows or currently-activated windows as foreground windows of respective divided display areas.

Implementations also provide an apparatus and a method for controlling a display screen, which can move a window that is being displayed on a display area to another divided display area, the window being displayed as a foreground window in the full size.

Implementations also provide an apparatus and a method for controlling a display screen, which can exchange windows that are being displayed on respective divided display areas with each other using an exchange key (⇆), and display the exchanged windows on the respective divided display areas as foreground windows in the full sizes of the respective display areas.

Implementation also provide an apparatus and a method for controlling a display screen, which can arrange the latest displayed windows of respective display areas as foreground windows in the full sizes according to a rearrangement command by a user when a dual program is run and at least one window is being displayed.

In one aspect, a method for displaying a plurality of windows includes dividing a display screen into first and second display areas. The method also includes displaying a first window on the first display area, displaying a second window on the second display area and displaying a third window in a foreground over a portion of the first display area and a portion of the second display area. The method further includes receiving an input signal to rearrange a display window when the third window is displayed in the foreground over the portion of the first display area and the portion of the second display area. In addition, the method includes determining whether the portion of the first area over which the third window is displayed is greater than the portion of the second area over which the third window is displayed in response to the input signal, in response to a determination that the portion of the first area over which the third window is displayed is greater than the portion of the second area over which the third window is displayed, arranging the third window to the first display area and in response to a determination that the portion of the second area over which the third window is displayed is greater than the portion of the first area over which the third window is displayed, arranging the third window to the second display area.

In another aspect, a method for controlling a display device includes loading and executing a dual program stored in a memory, dividing a display screen into first and second display areas and displaying a first window the first display area. The method also includes receiving an input command to display a second window when the first window is displayed on the first display area and no window is displayed on the second display area. The method further includes in response to the input command, determining that a window is displayed on the first display area and that no window is displayed on the second display area. In addition, the method includes in response to the determination that a window is displayed on the first display area and that no window is displayed on the second display area, determining to display the second window on the second display area and in response to the determination to display the second window on the second display area, displaying the second window on the second display area.

In yet another aspect, at least one computer-readable storage medium encoded with at least one computer program comprising instructions that, when executed, operate to cause a processor to perform operations includes dividing a display screen into first and second display areas, displaying a first window on the first display area and displaying a second window on the second display area. The method includes displaying a third window in a foreground over a portion of the first display area and a portion of the second display area and receiving an input signal to rearrange a display window when the third window is displayed in the foreground over the portion of the first display area and the portion of the second display area. The method further includes determining whether the portion of the first area over which the third window is displayed is greater than the portion of the second area over which the third window is displayed in response to the input signal. In addition, the method includes in response to a determination that the portion of the first area over which the third window is displayed is greater than the portion of the second area over which the third window is displayed, arranging the third window to the first display area and in response to a determination that the portion of the second area over which the third window is displayed is greater than the portion of the first area over which the third window is displayed, arranging the third window to the second display area.

In further yet another aspect, at least one computer-readable storage medium encoded with at least one computer program comprising instructions that, when executed, operate to cause a processor to perform operations includes loading and executing a dual program, dividing a display screen into first and second display areas and displaying a first window the first display area. The method also includes receiving an input command to display a second window when the first window is displayed on the first display area and no window is displayed on the second display area and in response to the input command, determining that a window is displayed on the first display area and that no window is displayed on the second display area. The method further includes in response to the determination that a window is displayed on the first display area and that no window is displayed on the second display area, determining to display the second window on the second display area In addition, the method includes in response to the determination to display the second window on the second display area, displaying the second window on the second display area.

DETAILED DESCRIPTION

Figure 1:
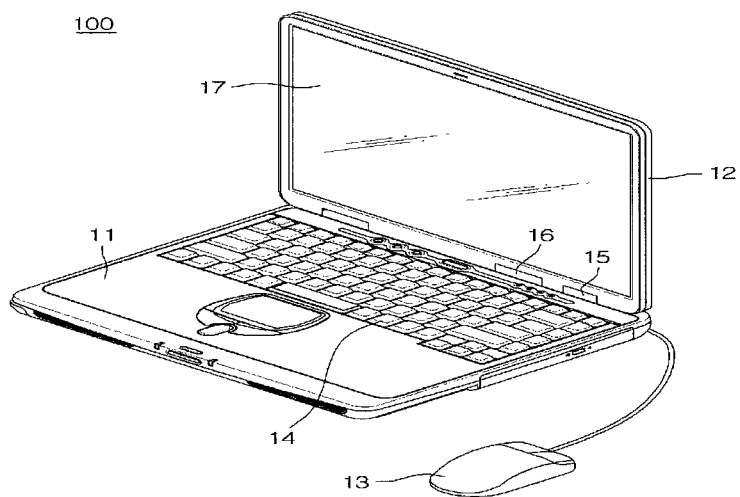
FIG. 1 is a view illustrating a system implemented with a dual program.

Reference will now be made in detail to the implementations of the present disclosure, examples of which are illustrated in the accompanying drawings.

An apparatus and a method for controlling an output display area will be described in detail with reference to the accompanying drawings. The described techniques may, however, be embodied in many different forms and should not be construed as being limited to the implementations set forth herein; rather, alternate implementations included in other retrogressive techniques or falling within the spirit and scope of the present disclosure can easily be derived through adding, altering, and changing, and will fully convey the concept of the disclosure to those skilled in the art.

For example, each display area represents each area divided on a display screen of a display device when a dual program is run.

A window represents an operation display screen (for example, window) that is displayed on each display screen based on each operating application.

Hereinafter, general descriptions of exemplary implementations will be made to enhance overall understanding of the technical spirit of the present disclosure.

The present disclosure relates to an apparatus for dividing an output display area of a display device to use.

For example, a display screen of a display device operationally connected to a main device is divided into a plurality of output display areas (hereinafter, referred to as display areas) by operation of a dual program. The display screen is divided at a predetermined ratio by a user, and a division boundary between the divided display areas may be variably adjusted using drag & drop.

Also, the windows in the respective display areas may be variably adjusted by drag & drop.

The windows displayed on the respective divided display areas may be basically displayed on display areas (left or right) that are configured in the menu "Position" of a menu screen by a user. The display area and the window may be adjusted or moved to another display area by control and command of a user.

Windows according to execution of various application programs (for example, MS Word or Power Point) including Internet programs may be displayed on the respective divided display areas.

Also, various image information based on display information (for example, position of a display area to be displayed and display area to be displayed (e.g., foreground)) preset by a user may be displayed on corresponding divided display areas.

Display condition information preset by a user may include the following:

I. Display/Arrangement

1. When a dual program is enabled from the off-state (display area not divided) of the dual program, and thus an output display area is divided into a plurality of display areas, display windows of each application operated by being selected later are displayed on corresponding display areas based on the following conditions.

1) Windows are displayed on a display area (left or right) that is set in the position of the menu function of the dual program by a user. Accordingly, the windows are continuously displayed (arranged) on the set display area regardless of a display area that user commands are inputted into (for example, by clicking). A first implementation includes the window display by the above condition.

2) When the sizes of the divided areas are configured different from each other, the window is preferentially displayed on a division display area having a greater size.

3) Videos may also be configured to be displayed by one of the above conditions or at a division boundary.

4) The window may be configured to be displayed on a display area except a display area where user commands are inputted (for example, clicking).

2. When at least one window, for example, one or more windows are being displayed in the off-state of the dual program, and the dual program is enabled to divide the output display area into a plurality of display areas, each displayed window is configured to be displayed on corresponding display areas based on the following conditions.

1) The windows are moved and preferentially displayed based on display area information set in the menu function "Position" of the dual program by a user.

2) Windows that have already been positioned in each divided image area are rearranged in a corresponding divided display area. Accordingly, the windows may be superimposedly rearranged. In this case, an uppermost window, that is, a foreground window may be the latest displayed window.

3) A window that is being displayed on a division boundary may be continuously displayed as it is, or may be moved to a greater division display area, a display area more superimposed on the division display area, or a right or left area based on a user's configuration to be displayed.

II. Case where a window that is being displayed in one display area is moved and displayed on a specific area using the direction keys (← and →)

1. When the dual program is in on-state, a window may be moved using the direction key (→) of the menu keys on the window. For example, an upper window in a left area, a first display area may be moved to upper position of a right area, a second display area, and may be automatically adjusted to the full size of the second display area.

A difference between movement by the direction keys and drag & drop is as follows.

1) A window moved by the direction keys may be automatically adjusted to the full size of the corresponding display area. However, the size of a window moved by drag & drop is maintained identical to the original size of the window.

2) The window moved by the direction keys is displayed on a different display area. However, the window by drag & drop may also be moved within the same display area.

III. Case where each window that is being displayed on each display area is displayed on a different display area using the exchange key (⇆), that is, the positions of the windows are exchanged with each other.

1. When the dual program is in on-state, a window may be exchanged using the exchange key (⇆) of the menu function provided in the form of Graphical User Interface (GUI) on the window that is being displayed. For example, a foreground window in a left area, a first display area may be moved to a right area, a second display area, and may be automatically adjusted to the full size of the second display area.

Also, the foreground window of the second display area may be moved to the first display area on the left side, and may be automatically adjusted to the full size of the first display area.

IV. Rearrangement

First, a difference between an arrangement and a rearrangement is that the arrangement is to display without satisfying the condition that a window is necessarily adjusted to the full size based on the on-state of the dual program, whereas the rearrangement is to arrange the latest displayed window as a foreground window in the full size based on a rearrangement command of a user in a state that the dual program is on and one or more windows are randomly arranged.

1. When one or more windows, for example, a plurality of windows are being displayed in the off-state of the dual program, and the dual program is enabled to an output display area into a plurality of display areas, the plurality of windows may be rearranged on the corresponding display areas according to a rearrangement command of a user.

2. The windows that are being displayed in each divided display area are rearranged in the full sizes of the corresponding display areas. Accordingly, all windows or foreground windows are superimposedly arranged on the corresponding display areas in the full sizes. In this case, the latest displayed window may become an uppermost window.

3. A window that is being displayed on a division boundary may remain at its position, or may be moved to a greater division display area, a display area more superimposed on the division display area, or a right or left area based on a user's setting to be rearranged in the full size of the corresponding area.

FIG. 1 illustrates an example system 100 implemented with a dual program.

Referring to FIG. 1, a system 100 may include a main body 11 and a display device 12. The main body 11 may include a control unit driving the system and a memory. The display device 12 may include a display screen 17 receiving image display signals from the main body 11 and displaying the image display signals.

The system 100 may further include a first input unit 13, a second input unit 14, a power display unit 15, and a configuration and adjustment unit 16. The first input unit 13 and/or the second input unit 14 may serve to input user's commands to perform operation of a dual program, and arrangement, movement, exchange or rearrangement of a display area, and may be connected to the main body 11. The power display unit 15 indicates that power is applied to the display device 12. The configuration and adjustment unit 16 serves to configure functions on the display device 12. The first input unit 13 may include a pointing device such as a mouse, and the second input unit 14 may include an input device such as a keyboard.

In this implementation, besides the first input unit 13, a mouse, and the second input unit 14, a keyboard, for inputting the user's commands, other devices such as a touchpad and a touch screen integrated with the display screen 17 may be used to input the user's commands.

Although a laptop computer in which the main body 11 is integrated with the display unit 12 is described in this implementation, a system in which the main body 11 and the display unit 12 are separated from each other may be used.

Also, although the first and second input units 13 and 14 are configured to be directly connected to the main body 11 in this implementation, the first and second input units 13 and 14 may be configured to be connected to the display unit 12 separated from the main body 11 to deliver signals to the main body 11.

Figure 2:
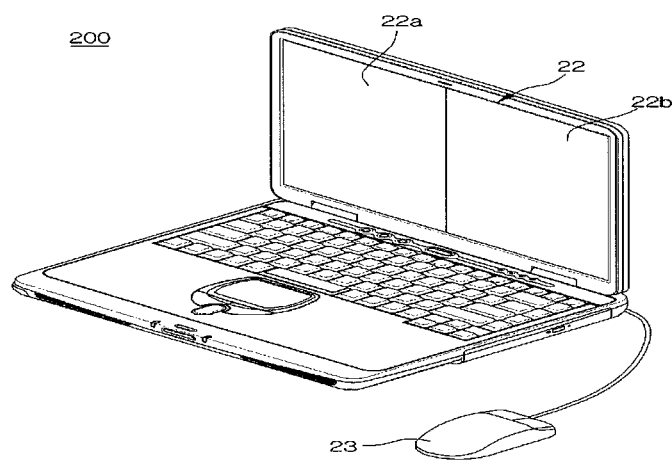
FIG. 2 is a view illustrating a system that is being implemented with a dual program.

FIG. 2 illustrates an example system 200 that is being implemented with a dual program according to an implementation.

Referring to FIG. 2, a system 200 may include a mouse 23 connected to a main body and inputting user's commands and a display screen 22 of a display device. The display screen 22 of the display device may be divided into a first display area 22a and a second display area 22b.

The sizes of the divided display areas 22a and 22b may be preset using a dual program by a user (for example, ratios of 5:5 or 7:3), and may be variably adjusted by the dual program or the drag & drop method.

Although the display screen 22 is divided into a plurality of areas (at least two areas) in a horizontal X-axis direction in this implementation, the display screen 22 may be divided in a vertical Y-axis direction, technical approaches of which are identical to those of the division of the X-axis direction.

Figure 3:
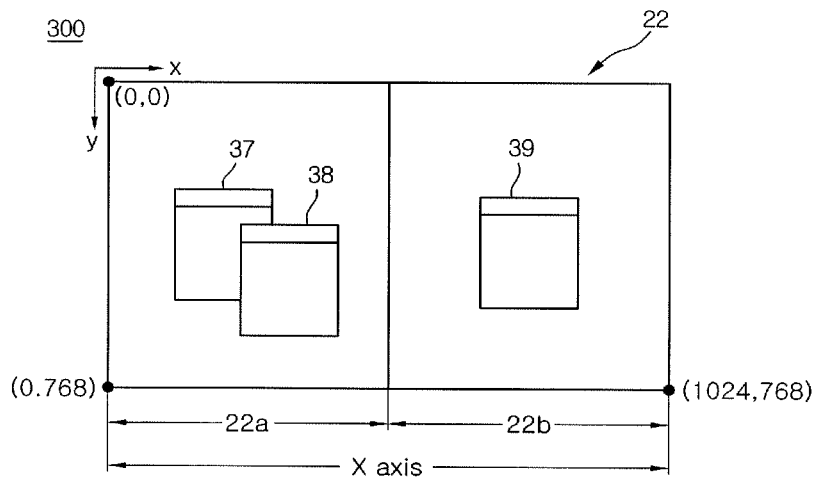
FIG. 3 is a view illustrating windows displayed on respective divided display areas.

FIG. 3 illustrates example windows displayed on respective divided display areas 300 according to an implementation.

Referring to FIG. 3, two windows 37 and 38 are arranged in a first display area 22a on the left side of the divided display area 300, and one window 39 is disposed on the right side of the divided display area 300 along the X-axis (e.g., on the second display area 22b).

A control unit in a main body of a system may verify positions of the respective display areas on the X-axis to find which display area the respective windows exist in.

On the other hand, when the control unit is included in a display device, the control unit of the display device can perform the verification operation.

The windows displayed or arranged on the display areas may be configured to be displayed according to at least one of the preceding and following conditions.

I. Display/Arrangement

1. When a dual program is driven from the off-state (display area not divided) of the dual program, and thus a display screen is divided into a plurality of display areas, windows of respective application programs executed later are displayed on corresponding display areas based on the following conditions.

1) Windows are displayed on a display area (left or right) that is set in the Position of the menu function of the dual program by a user.

Accordingly, the windows are continuously displayed (arranged) on the set display area regardless of a display area that user commands are inputted into (for example, clicking). A first implementation includes the window display by the above condition.

2) When the sizes of the divided areas are configured to be different from each other, the window is preferentially displayed on a division display area having a greater size.

3) Videos may also be configured to be displayed by one of the above conditions or at a division boundary.

2. When at least one window, for example, one or more windows are being displayed in the off-state of the dual program, and the dual program is enabled to divide the display screen into a plurality of display areas, each displayed window is configured to be displayed on corresponding display areas based on the following conditions.

1) The windows are moved and preferentially displayed based on display area information set in the Position of the menu function of the dual program by a user.

2) Windows that have already been positioned in each divided image area are rearranged in a corresponding divided display area. Accordingly, the windows may be superimposedly rearranged. In this case, an uppermost window, that is, a foreground window may be the latest displayed window.

3) A window that is being displayed on a division boundary may remain at its position, or may be moved to a greater division display area, a display area more superimposed on the division display area, or a right or left area based on a user's setting to be displayed.

Figure 4:
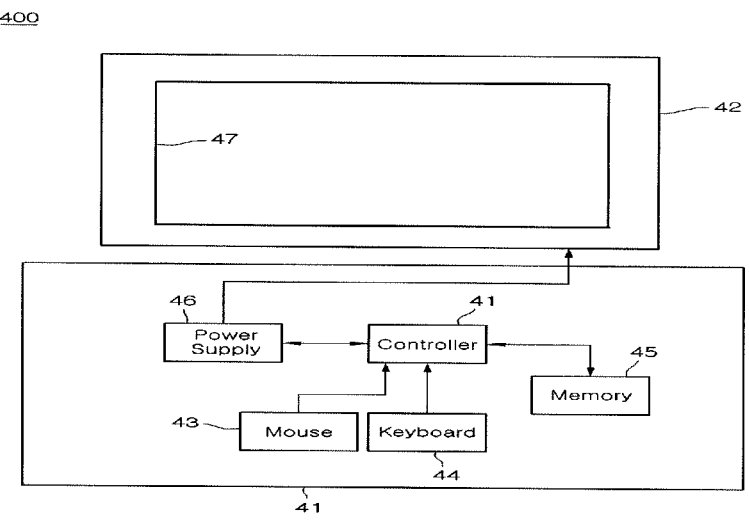
FIG. 4 is a view illustrating a system including a computer and a display device.

FIG. 4 illustrates an example system 400 including a computer 41 corresponding to a main body and a display device 42 according to an implementation.

Referring to FIG. 4, the computer 41 and the display device 42 are operationally connected to each other.

The computer 41 may include a power supply 46, a memory 45, a mouse 43, a keyboard 44, and a controller 41. The power supply 46 applies power to the system 400. The memory 45 stores a dual program for dividing a screen, operation applications, and programs for controlling the operations. The mouse 43 or the keyboard 44 is used to input user's commands (for example, on/off of the dual program, adjustment of a display area, and movement, exchange or rearrangement of window). The controller 41 may control operations according to the user's commands.

The memory 45 also stores a filter driver program of the computer 41 for verifying an uppermost window, that is, a foreground window in each display area.

Accordingly, since the foreground window can be recognized among one or more windows, that is, windows that are currently being executed, the foreground window may be rearranged in the full size of the corresponding display area.

Here, an exemplary function recognizing the foreground by the filter driver will be expressed as follows.

BOOL SetForegroundWindow( );

Return Value

Nonzero if the function is successful; otherwise 0.

The above function is a function executed to allow each application to become a foreground window. Accordingly, the filter driver can hook the function to find the foreground window.

Generally, since a foreground window is the latest displayed window, the controller may verify a time point of the display of each window to find whether the window is the foreground window.

The display device 42 may include a display screen 47 in which at least one display area is displayed.

In the configuration as described above, when user's commands are inputted using predetermined keys of an input mechanism such as a keyboard or a mouse, a dual program and/or applications stored in a memory are operated according to control of a controller, and then windows are displayed on divided display areas of a display based on the configured display conditions.

Particularly, it has been described in the first implementation that windows are configured to be continuously and superimposedly displayed on the display areas selected by a user.

As another example, the windows may be preferentially displayed on a display area which user's commands are inputted into (e.g., by clicking).

As still another example, the windows may be preferentially displayed on an area except the display area which the user's commands are inputted into (e.g., by clicking).

The controller, memory, and input unit of user's commands configured in the computer may be alternatively configured in the display device.

Figure 5:
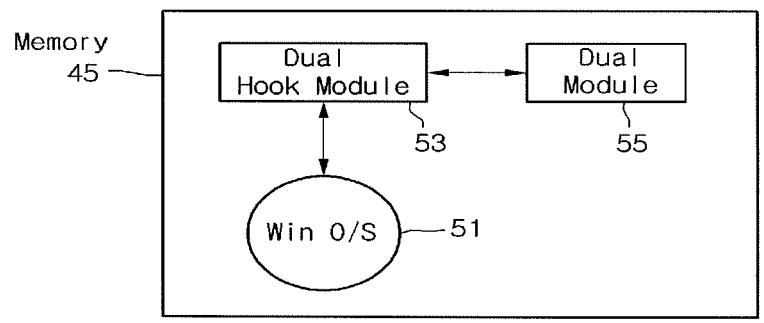
FIG. 5 is a view illustrating operation of a program stored in a memory to display windows on display areas, based on a dual program and an operating application.

FIG. 5 illustrates example operation blocks 500 of each program included in a memory 45 to display/arrange windows on display areas, based on a dual program and an operating application.

Referring to FIG. 5, the operation blocks 500 may include a Windows Operating System (OS) block 51 and a dual hook module 53. The Windows OS 51 is a program that enables a user to use a computer by controlling hardware or various software of the computer. The dual hook module 53 delivers information on the conditions of various windows on display screens of the display device to a dual module 55 according to the operation of the Windows OS.

The dual module 55 may appropriately arrange or rearrange the windows on each display area according to a dual web logic (which area a window that is already being displayed exists in) using information on the state or position of the windows received from the dual hook module.

The dual hook module 53 transmits the state or position of the current windows that is acquired or verified upon movement (for example, open, close, drag, movement, exchange, and rearrangement of the windows) of the windows by Windows OS to the dual module 55.

Figure 6:
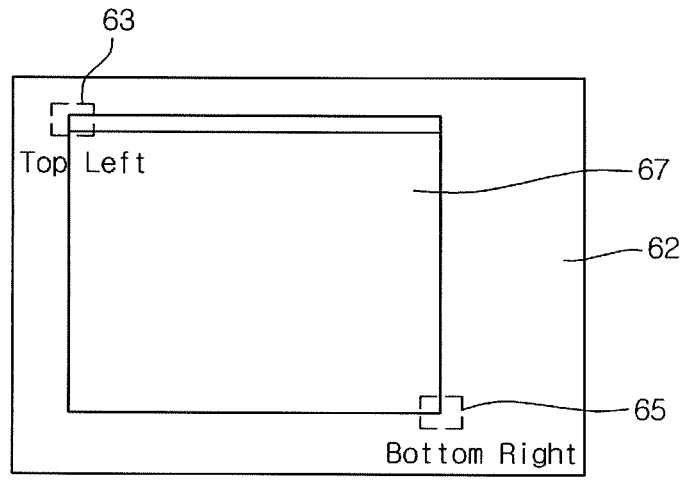
FIG. 6 is a view illustrating a position state of a current window acquired or verified by a dual hook module.

FIG. 6 illustrates an example 600 of a position state of a current window 67 acquired or verified by a dual hook module 53 according to an implementation.

Referring to FIG. 6, information on top left and bottom right positions 63 and 65 of windows on a display screen 62 displayed by Windows OS are acquired (verified) by a dual hook module.

Accordingly, when a dual program is operated to divide a display area, windows are displayed (arranged) on corresponding display areas, based on information on the positions of the verified windows and/or information on display conditions set by a user.

Figure 7:
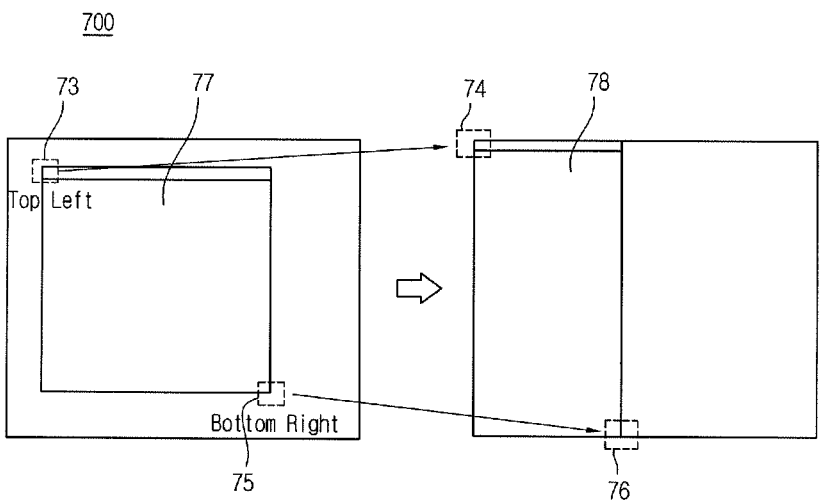
FIG. 7 is a view illustrating a window arranged on a corresponding divided display area when a dual program is run.

FIG. 7 illustrates an example 700 of a window arranged on a corresponding divided display area when a dual program is run according to information on a position of the acquired window as shown in FIGS. 5 and 6.

Referring to FIG. 7, a dual hook module acquires information on the positions of the top left 73 and the bottom right 75 of a window 77, and arranges the window 77 into a position information state 74 and 76 of a left display area 78 of the divided window based on a preset dual web logic.

Accordingly, since the position information (73 and 75) of the window 77 is located at a left side around the midpoint of the X-axis, the window 77 is arranged at the left display area 78, position information 74 and 76 based on the logic.

The operation method as described above may be implemented when windows that are being displayed in the off-state of the dual program are arranged or rearranged on each display areas upon turn-on of the dual program.

Figure 8:
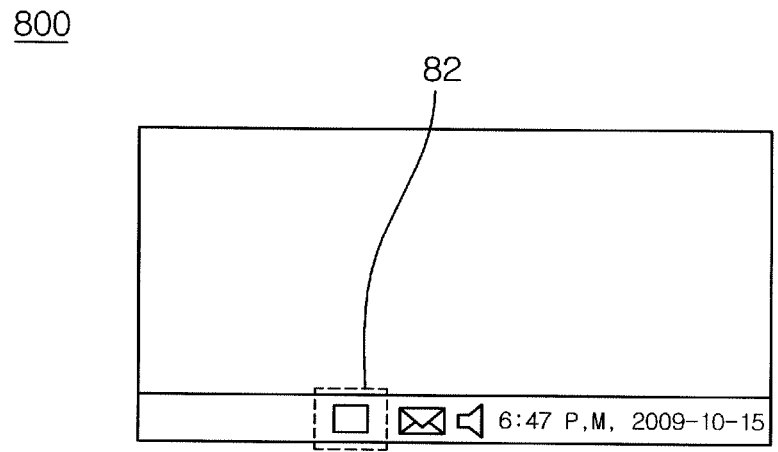
FIG. 8 is a view illustrating a dual program loaded when a main system, for example, a computer is booted.

FIG. 8 illustrates an example of a loading state 800 of a dual program when a main system, for example, a computer is booted.

Referring to FIG. 8, when power is applied to a computer, a dual program is loaded by the operating system while an icon 82 may be displayed at a predetermined position (generally, right bottom) of a display screen.

Figure 10:
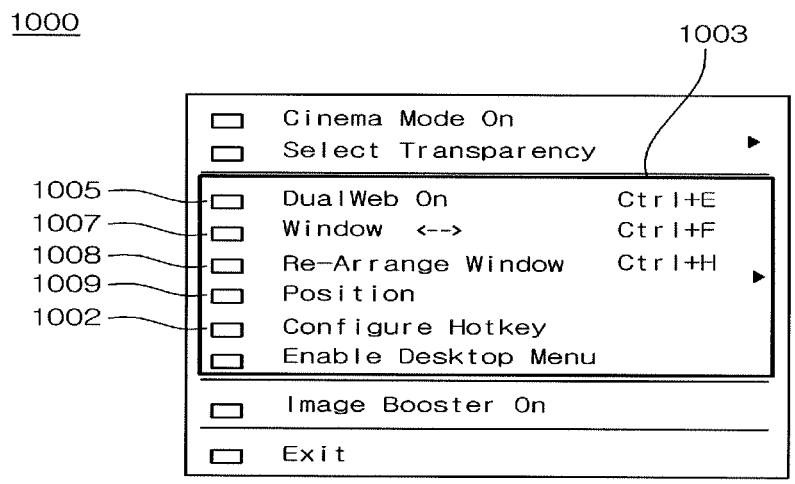
FIG. 10 is a view illustrating a menu screen of a dual program.

Accordingly, if the icon 82 indicating the dual program is clicked, the dual program may display the operation menu as shown in FIG. 10.

Figure 9:
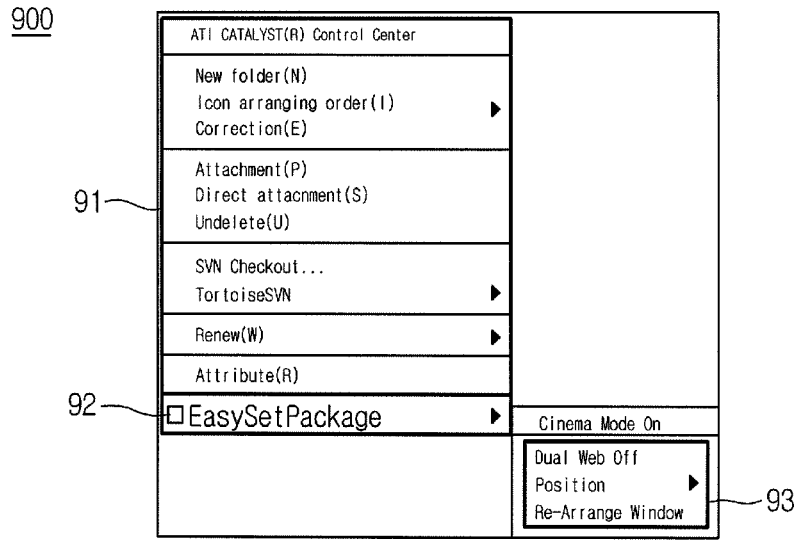
FIG. 9 is a view illustrating a method for displaying an operation menu of a dual program.

FIG. 9 illustrates an example method 900 for displaying an operation menu of a dual program.

Referring to FIG. 9, when a computer is booted using the operating system, a desktop menu 91 is popped up by an operation of an input mechanism, for example, a click of the right button of a mouse on the background screen. Here, a predetermined item 92 may be selected to display the menu 93 of the dual program.

FIG. 10 illustrates an example 1000 of a menu screen of a dual program.

Referring to FIG. 10, according to the operation of FIGS. 8 and 9, a menu screen 1003 of a dual program is displayed, and menu functions for each operation of the dual program are selected from the displayed menu screen 1003.

The menu functions may include on/off 1005 of operation of the dual program, direction keys (← and →;) for movement of a window from a first display area to a second display area, an exchange key (⇆) 1007 for exchanging windows with each other, and rearrangement key 1008 for displaying at least one window displayed on each display area in the full size of a foreground window.

The positions of the windows to be displayed may be set by a user.

For this, "Position 1009" of the menu function of FIG. 10 may be selected to configure the position of the display area to become a left display area or a right display area.

The above configuration may be applied to the position of a display area of a window that is already displayed when the dual program is executed.

Figure 11:
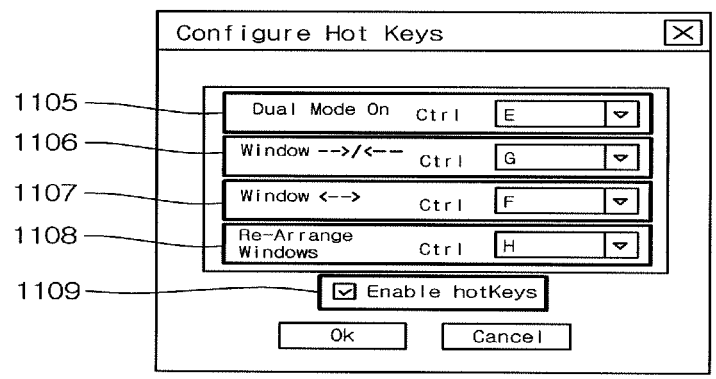
FIG. 11 is a view illustrating menu functions of FIG. 10.

FIG. 11 illustrates an example 1100 of respective menu functions of FIG. 10 assigned to hot keys.

Referring to FIG. 11, the menu function "Configure Hot-Key" 1002 may be selected to assign each menu function of FIG. 10 to predetermined keys, which can perform the corresponding menu functions.

For example, the Dual mode on/off 1105 may be assigned to Ctrl+E, Window movement (→ and ←) 1106 may be assigned to Ctrl+G, Window exchange (⇆) 1107 may be assigned to Ctrl+F, and Window rearrange 1108 may be assigned to Ctrl+H. Also, the Hotkey function may be activated by the checkbox, "Enable HotKeys" 1009.

So far, the basic technical sprit and implementation of the present disclosure has been described with reference to the accompanying drawings. Hereinafter, the understanding of the technical spirit of the present disclosure will be assured through exemplary implementations of each function of the menu screen that are applied with the above descriptions.

Figure 12:
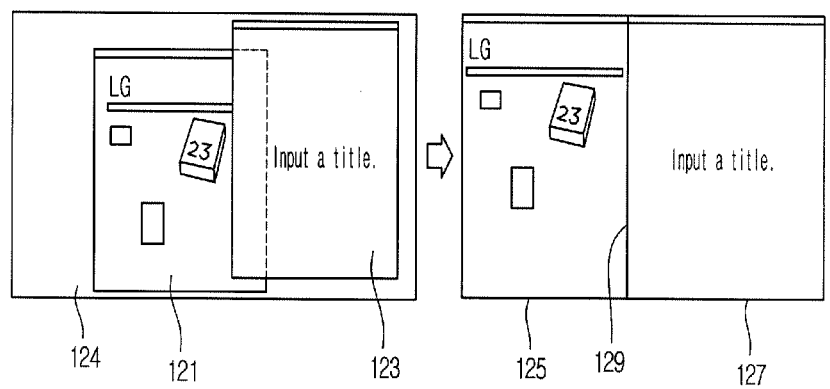
FIG. 12 is a view illustrating windows arranged on a display screen.

FIG. 12 illustrates example windows 1200 arranged on a display screen when the dual program is set to "on" among the functions of the menu screen of FIG. 10 or 11.

Referring to FIG. 12, before the dual program is executed, two windows 121 and 123 are being displayed on a display screen 124.

Thereafter, if the function of "Dual program ON" on the menu screen is selected by a user to operate the dual program, the display screen 124 is divided into a left display area 125 and a right display area 127 at a predetermined ratio around the X-axis.

Accordingly, the windows 121 and 123 that are being displayed before the execution of the dual program may be moved and arranged on the divided left and right display areas, respectively.

In this case, movement conditions of the windows 121 and 123 to the left and right display areas are as follows.

When the dual program is run for the first time, a general ratio of the left divided area to the right divided area may be 5:5, but this may vary with configuration.

Accordingly, the windows 121 and 123 may be moved and arranged on the left and right display areas in accordance with the occupying ratio (or overlapping degree) of the windows 121 and 123 in the left and right areas 125 and 127.

Specifically, the first window 121 is displayed over a division boundary 129, but occupies the left display area 125 much more than the right display area 127. Accordingly, when the dual program is run, the first window 121 is moved and arranged on the left display area in the full size of the left display area.

As shown in FIG. 7, since the positions of windows that are being displayed can be known, and position information of the division boundary can also be known, the areas that the windows predominantly occupy, respectively, can be determined.

When the function "Dual program ON" for running the dual program is selected in a case where the one window is displayed on the display screen in the full size of the display area, the display screen may be divided into the left and right display areas at a predetermined ratio around the X-axis. In this case, conditions for determining which display area among the divided image areas the windows being displayed in the full size is moved to and arranged in are as follows.

1. A window may be displayed on a display position configured in the menu function of FIG. 10 by a user. For example, when the user sets the display position to the left, the window is unconditionally displayed on the left display area.

2. If the user does not select the display position, the window may also be displayed on a greater divided display area.

3. If the user does not select the display position, the window may also be displayed over the division boundary.

4. If the user does not select the display position, the window may also be alternately displayed on the left and right display area, or may also be displayed on only one of the left and right display area.

5. The window may be displayed on a display area inputted by a user's command.

6. The window may be displayed on a different display area from the display area by the user's command, e.g., an opposite display area.

Figure 13:
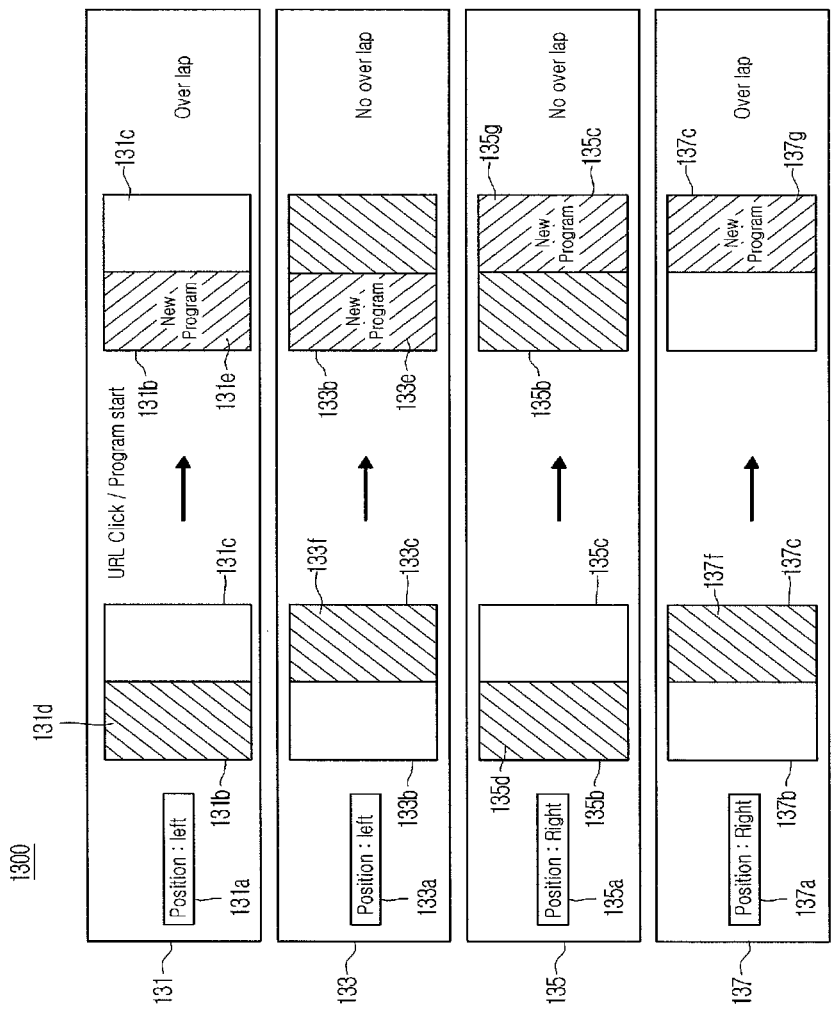
FIG. 13 is a view illustrating windows displayed at respective output positions.

FIG. 13 illustrates examples 1300 of a window displayed on each display position that is configured in the menu function of FIG. 10 by a user.

Referring to FIG. 13, reference numerals 131 and 133 represent cases where a display position on which a window is to be displayed corresponds to the left area, and reference numerals 135 and 137 represent cases where the display position on which the window is to be displayed corresponds to the right area.

When the display or arrangement position is configured as described above, a window to be displayed later may be displayed on the corresponding display area position according to the configuration.

1. In reference numeral 131, the dual program is run to divide a display area into a left display area 131b and a right display area 131c. While there is an already displayed window 131d in the left display area 131b, a display position 131a is set to the left area in the menu function "Position" of FIG. 10.

Thereafter, a window of an application operated (by URL click) according to a user's command is unconditionally displayed on the left display area 131b. That is, a new window is displayed on the preset display area regardless of a display area where the user's command is inputted (for example, URL click) to operate a new program.

Accordingly, as shown in FIG. 13, since the window 131d is already being displayed on the left display area 131b, a window 131e of the new program by the user's command may be superimposed on the window 131d of the left display area 131b.

The display of a window through the configuration of the display position as described above may be performed by a presetting before the dual program is run (for example, before shipment of a product).

Thereafter, when the dual program is run, the respective windows are continuously arranged in the preset display area.

2. In reference numeral 133, the dual program is run to divide a display area into a left display area 133b and a right display area 133c. While there is an already displayed window 133f in the right display area 133c, a display position 133a is set to the left area in the menu function "Position" of FIG. 10.

Thereafter, a window of an application operated according to a user's command is unconditionally displayed on the left display area 133b. That is, a new window is displayed on the preset display area regardless of a display area where the user's command is inputted to operate a new program.

Accordingly, as shown in FIG. 13, since there is no window that is already being displayed on the left display area 133b, a window 133e of the new program by the user's command may be displayed on the left display area 133b without being superimposed on the window 133f of the right display area 133c.

3. Operation principles of reference numerals 135 and 137 are identical to those of reference numerals 131 and 133, except that a display position thereof is different from the display position of reference numerals 131 and 133.

In reference numeral 135, the dual program is run to divide a display area into a left display area 135b and a right display area 135c. While there is an already displayed window 135d in the left display area 135b, a display position 135a is set to the right area in the menu function "Position" of FIG. 10.

Thereafter, a window of an application operated according to a user's command is unconditionally displayed on the right display area 135c. That is, a new window is displayed on the preset display area regardless of a display area where the user's command is inputted (for example, URL click) to operate a new program.

Accordingly, as shown in FIG. 13, since there is no window that is already being displayed on the right display area 135c, a window 135g of the new program by the user's command may be displayed on the right display area 135c without being superimposed.

4. In reference numeral 137, the dual program is run to divide a display area into a left display area 137b and a right display area 137c. While there is an already displayed window 137f in the right display area 137c, a display position 137a is set to the right area in the menu function "Position" of FIG. 10

Thereafter, a window of an application operated according to a user's command is unconditionally displayed on the right display area 137c. That is, a new window is displayed on the preset display area regardless of a display area where the user's command is inputted to operate a new program.

Accordingly, as shown in FIG. 13, since the window 137f is already being displayed on the right display area 137c, a window 137g of the new program by the user's command may be superimposed on the window 137f of the right display area 137c.

Figure 14:
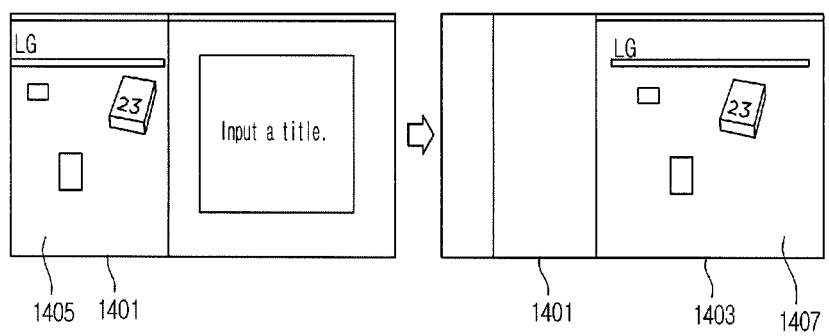
FIG. 14 is a view illustrating a window moved from a first display area to a second display area using direction keys (→ and ←) of a menu function.

FIG. 14 illustrates an example 1400 of a window moved from a first display area to a second display area using direction keys (→ and ←) of the menu function of FIG. 10 or 11.

A difference between movement using the direction keys and movement through drag & drop is roughly as follows.

1) The window moved by the direction keys may be automatically adjusted in the full size of corresponding display area. However, the window moved by drag & drop maintains the same size as the original window.

2) The window moved by the direction keys is displayed on a different display area. However, the window by drag & drop may also be moved within the same display area.

As shown in FIG. 14, when a window 1405 of a left display area 1401 is a foreground window in the on-state of the dual program, the window 1405 may be moved to a right display area 1403 according to selection of the direction key (→), and displayed as a window 1407 of the full size.

Figure 15:
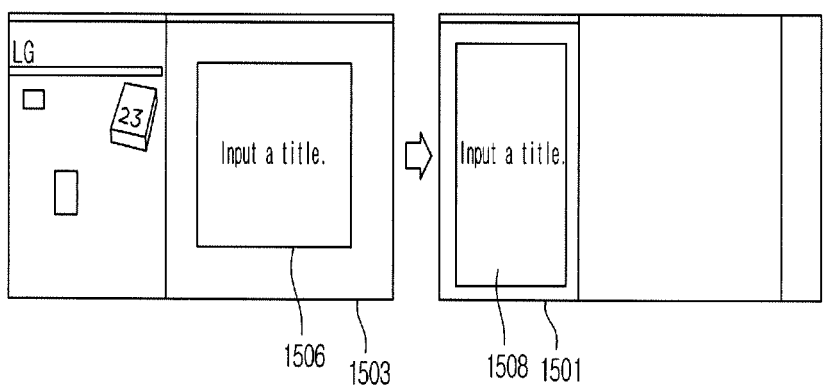
FIG. 15 is a view illustrating a window moved from the right display area to the left display area by a direction key (←).

FIG. 15 illustrates an example 1500 of a window 1508 moved from the right display area 1503 to the left display area 1501 by the direction key (←) and displayed in a full size when the window 1506 of the right display area 1503 is a foreground window in the on-state of a dual program.

Figure 16:
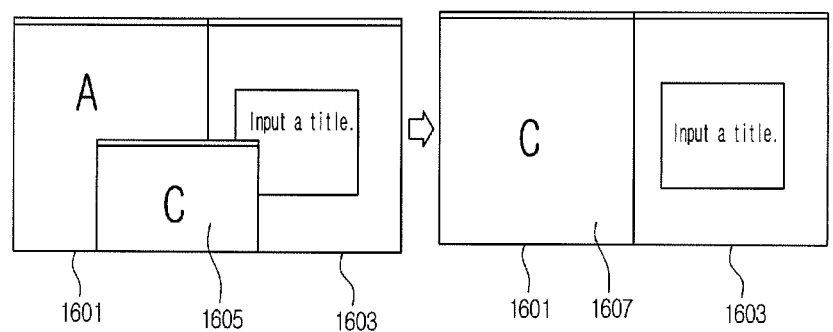
FIG. 16 is a view illustrating a foreground window extending over a first display area and a second display area moved to the first display area by a direction key (←).

FIG. 16 illustrates an example 1600 of a foreground window 1605 extending over a first display area 1601 and a second display area 1603 (portions of the foreground window 1605 are superimposed on the first display area 1601 and the second display area 1603, respectively) moved to the first display area 1601 by the direction key (←) and displayed as a window 1607 of a full size on the first display area 1601.

Figure 17:
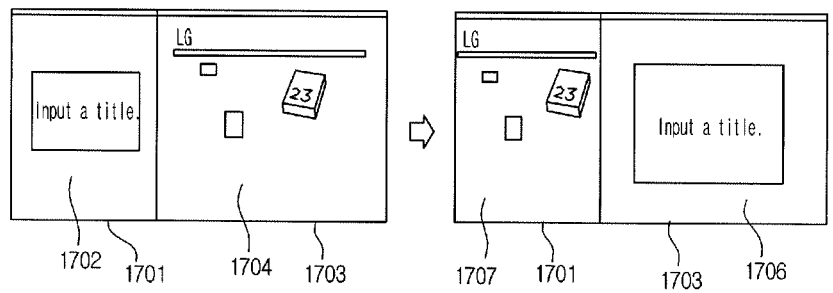
FIG. 17 is a view illustrating windows of a first display area and a second display area exchanged with each other by an area exchange key (⇆) of the menu function.

FIG. 17 illustrates an example 1700 of windows of a first display area and a second display area exchanged with each other by selecting an area exchange function (⇆) of the menu function of FIG. 10 or 11, and displayed on corresponding areas in full sizes, respectively.

Referring to FIG. 17, a window 1702 of a first display area 1701 may be exchanged with a window 1706 of a second display area 1703, and a window 1704 of the second display area 1703 may be exchanged with a window 1707 of the first display area 1701, respectively.

Figure 18:
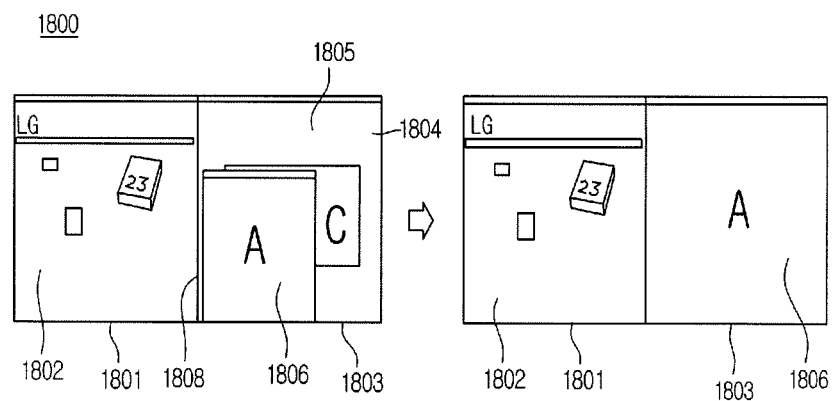
FIG. 18 is a view illustrating an operation of the rearrangement window function of the menu function.

FIG. 18 illustrates an example 1800 of an operation by selection of the rearrangement window function among the menu function of FIG. 10 or 11 while respective windows are being displayed on respective divided areas through execution of a dual program, predetermined display conditions (for example, display by position configuration or display on greater division area), and/or drag & drop by a user.

Referring to FIG. 18, a display area is divided into a first display area 1801 on the left side and a second display area 1803 on the right side around a division boundary 1808 according to the operation of the dual program.

Also, one window 1802 is displayed on the first display area 1801, and three windows 1804, 1805 and 1806 are displayed on the second display area 1803.

When the windows 1802, 1804, 1805 and 1806 are being displayed on the respective display areas, and the rearrangement window function is selected, the window 1802 may be still displayed on the first display area 1801. However, the window 1806, the foreground window among the three windows 1804, 1805 and 1806 that are being displayed before the selection of the rearrangement window function may be displayed on the second display area 1803 in the full size.

The two windows 1805 and 1804 may also be displayed as background windows of the foreground window 1806 in the full sizes, respectively.

Figure 19:
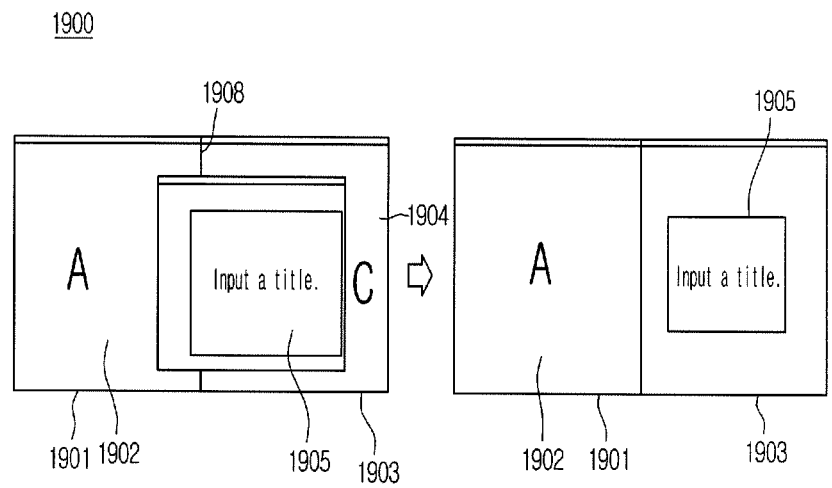
FIG. 19 is a view illustrating a rearrangement function.

FIG. 19 illustrates an example 1900 of a rearrangement function.

Referring to FIG. 19, a display area may be divided into a first display area 1901 on the left side and a second display area 1903 on the right side around the division boundary 1908 through operation of the dual program.

One window 1902 may be displayed on the first display area 1901, and one window 1904 may be displayed on the second display area 1903. Also, another window 1905 is displayed extending (superimposed) over the first and second display areas 1901 and 1903.

When the windows 1902 and 1904 are being displayed on the display areas 1901 and 1903, respectively, and the rearrangement window function is selected, the first window 1902 is still displayed on the first display area 1901, but the window 1905, the foreground window is displayed on the second display area 1903 in the full size.

The grounds that the window 1905 extending over the first and second display areas 1901 and 1903 is moved and rearranged in the second display area 1903 are as follows.

Since the window 1905, the foreground window that is being displayed extending over the first and second display areas 1901 and 1903, has a superimposed portion on the second display area 1903 greater than that on the first display area 1901 around the division boundary 1908, the window 1905 is moved and arranged in the second display area 1903.

Figure 20:
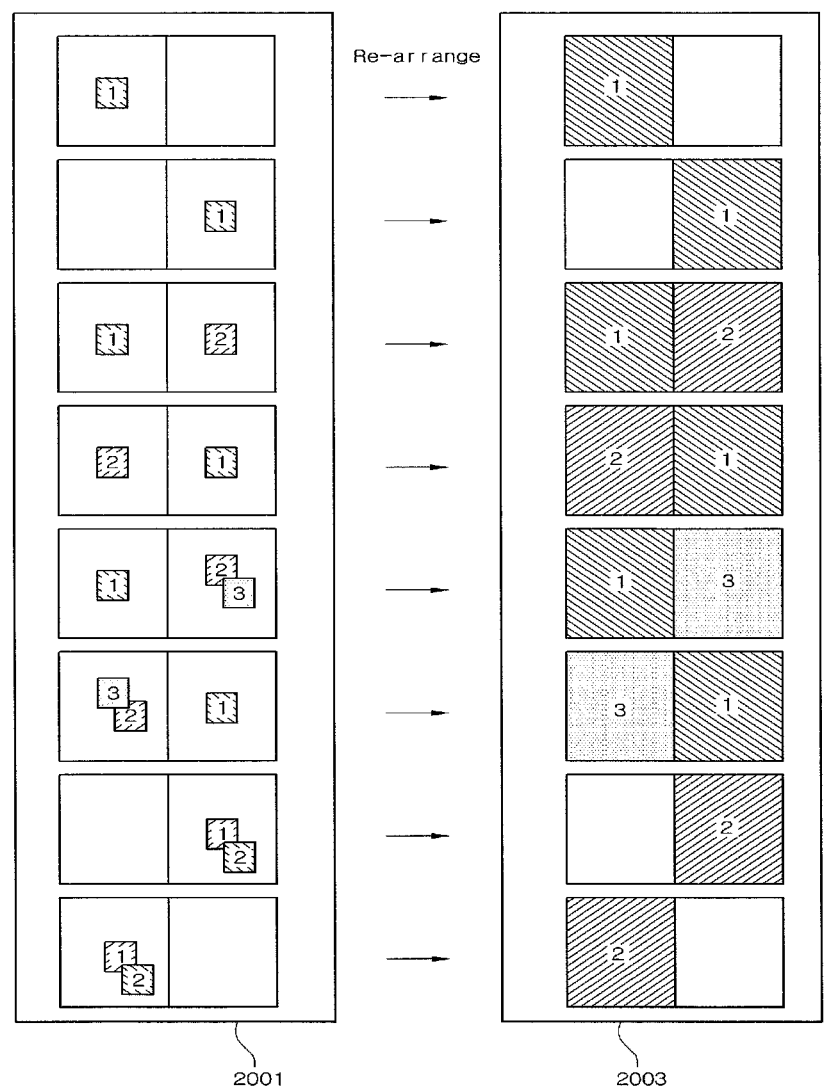
FIG. 20 is a view illustrating a rearrangement of a window.

FIG. 20 illustrates an example 2000 of a rearrangement of a window.

As shown in reference numeral 2001, a window is displayed on at least one of divided display areas. The numerals marked in each window represent the display order of the windows.

Accordingly, as shown in reference numeral 2003, when the rearrange menu function is selected, the latest displayed windows in the display areas are displayed as foreground windows in the full sizes, respectively.

Figure 21:
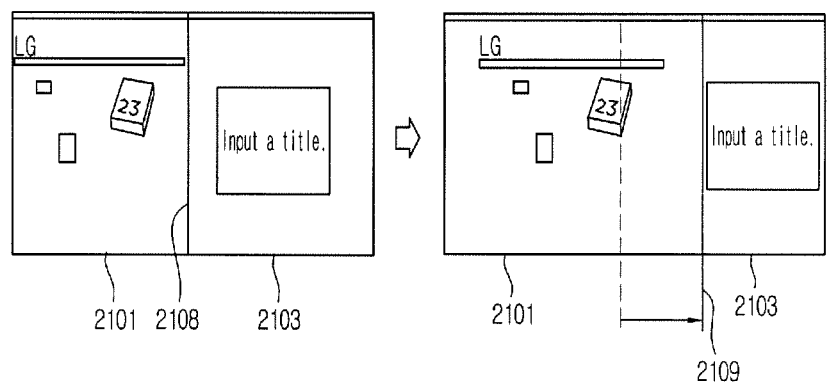
FIG. 21 is a view illustrating respective display areas divided at a predetermined division ratio.

FIG. 21 illustrates an example 2100 of respective display areas divided at a predetermined division ratio and adjusted by drag & drop.

Referring to FIG. 21, a display area is divided into a first display area 2101 and a second display area 2103 around the centric division boundary 2108 according to operation of the dual program.

The sizes of divided display areas 2101 and 2103 may be adjusted by a user's command.

For example, the division boundary 2108 may be dragged and dropped at a target location by a user, and thus a new division boundary 2109 may be formed. That is, the division boundary 2108 may be pointed and clicked by a first input unit such as a mouse, and may be dragged and dropped at a desired location to locate a new division boundary 2109 at the dropped location.

A position of the new division boundary 2109 is stored in the memory 45.

As shown in FIG. 21, as the division boundary 2108 is moved right, the controller of the computer systems 100 and 200 may progressively increase the size of the first display area 2101 and decrease the size of the second display area 2103.

Here, when a window located in the first display area is configured to be displayed in the maximum size, the window may be automatically enlarged to the maximum size of the newly set display area.

On the contrary, a window located in a decreasing display area may automatically shrink.

Accordingly, a specific window may be displayed in a greater or smaller size according to user's selection.

Figure 22:
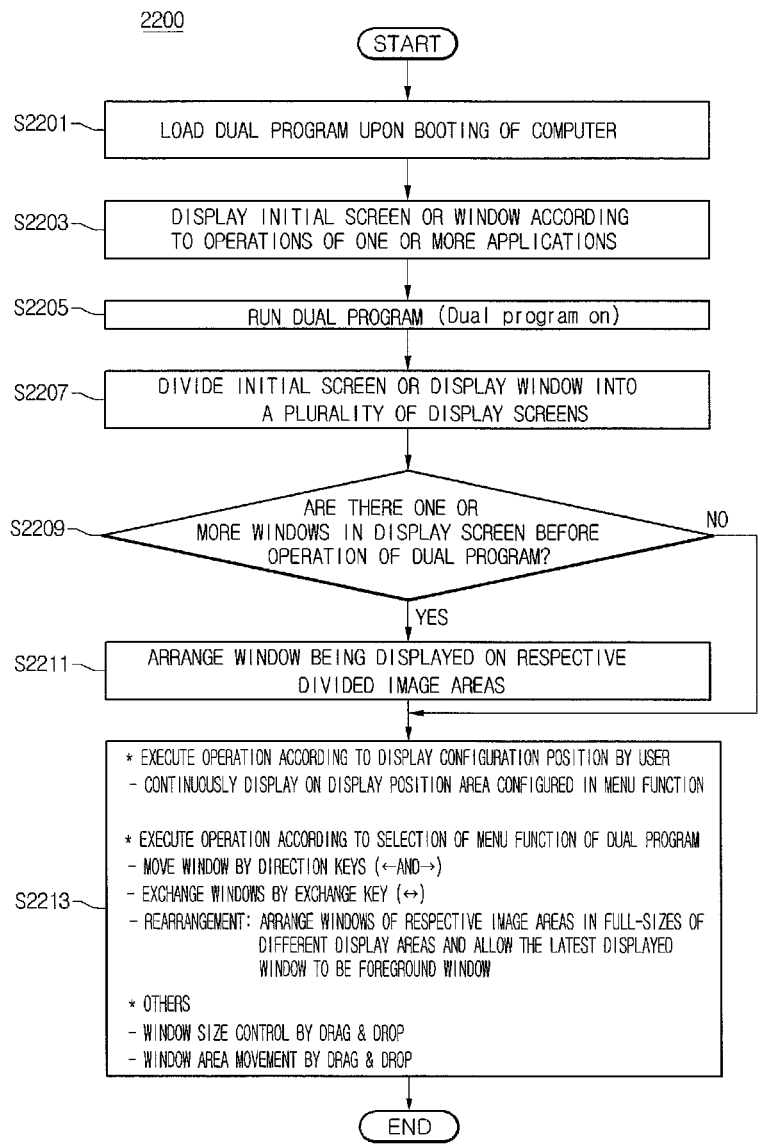
FIG. 22 is a flowchart illustrating operations of menu functions according to operation of the dual program.

FIG. 22 illustrates an example of respective operations 2200 of menu functions according to operation of the dual program.

In operation S2201, power may be applied to the systems 100 and 200 of FIGS. 1 and 2, and thus the systems may be booted with an operating system. Then, a dual program stored in a memory of the system may be together loaded.

In operation S2203, an initial screen according to the booting of the system or windows according to other application programs may be displayed on a display device.

In operation S2205, the dual program may be selected to operate as shown in FIGS. 8 through 11.

In operation S2207, the display screen may be divided into a plurality of display areas at a predetermined division ratio according to the operation selection of the dual program.

The predetermined division ratio for the position of the divisional boundary may be stored in the memory 45.

The display window may be generally divided into right/left display areas around the X-axis at the division ratio of 5:5. However, the display window may also be divided into three or more display areas according to the use's configuration, and the division ratio may also be individually configured by a user. Furthermore, the display image may also be vertically divided around the Y-axis, and may be divided in a cross shape.

In operations S2209 and S2211, the display screen may be divided into at least two display areas according to the operation of the dual program. In this case, operating windows that are being displayed by other application programs (for example, MS Word, Power Point, and Internet program) before the operation of the dual program are moved to and arranged in the divided display areas according to the following conditions.

1) As shown in FIG. 10, the operating windows may be preferentially moved to and displayed on display areas (right or left) that have been set using the Position of the menu function of the dual program by a user.

2) If the operating windows have not been set using the Position of the menu function, windows located in the respective divided image areas may be arranged in corresponding divided display areas.

Accordingly, the windows may be superimposed over each other, and the latest displayed window may be a foreground window.

3) A window that is being displayed on a division boundary may remain at its position, or may be moved to a greater division display area.

In operation S2213, when the display screen according to the operation of the dual program is divided to the respective display areas, the windows operated by the respective application programs may be displayed, arranged, moved, exchanged, or rearranged on the respective divided display areas according to the following conditions.

1) As shown in FIG. 10, the windows may be continuously displayed on the corresponding display areas according to the display area (right or left) information configured in the Position of the menu function of the dual program by a user.

2) The windows that are being displayed on the respective display areas or the division boundary may be moved to a first or second display area by selecting the function of the menu screen of the FIGS. 10 and 11.

The windows may be moved to or displayed on specific display areas using the direction keys (← and →).

The windows that are being displayed on the respective display areas may be exchanged with each other using the exchange key (⇆). That is, the windows may be exchanged and displayed on different areas from each other.

The windows that are randomly being displayed on the respective display areas may be rearranged through the rearrangement function. In this case, the latest displayed window may become a foreground window in the full size of the corresponding display area.

3) As an additional function, the display areas may be adjusted by pointing the division boundary and performing drag & drop using a mouse. That is, the sizes of the respective windows may be adjusted.

Figure 23:
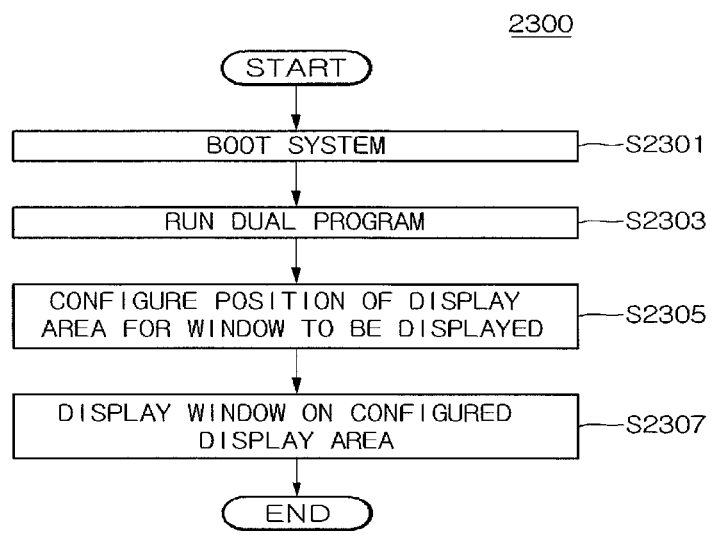
FIG. 23 is a flowchart illustrating a window output by a position configuration of an output display area.

FIG. 23 illustrates an example process 2300 of a window output by a position configuration of an output display area.

Referring to FIG. 23, in operations S2301 and S2303, a system is booted, and a dual program stored in a memory is loaded and executed.

In operations S2305 and S2307, when image area positions are configured by a user, windows displayed by application programs are continuously displayed on the configured display areas.

The position configuration of the display areas may be performed using the menu screen of the dual program or predetermined specific keys, hot keys to select one of a plurality of divided display areas. Thus, the window may be continuously displayed at a position on the selected display area.

Figure 24:
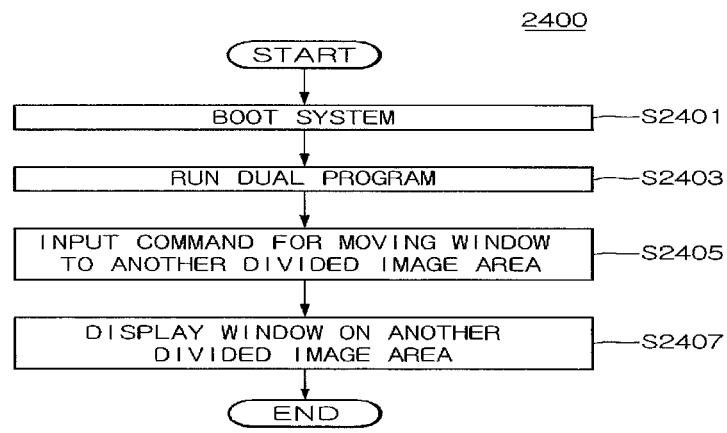
FIG. 24 is a flowchart illustrating movement of a window from a current display area to another display area.

FIG. 24 illustrates an example process 2400 of a movement of a window from a current display area to another display area.

Referring to FIG. 24, in operations S2401 and S2403, a system is booted, and a dual program stored in a memory is loaded and executed.

In operations S2405 and S2407, a window may be moved to a different display area through display of the menu screen or input of a predetermined specific key, and arranged on the different display area as a foreground window.

Figure 25:
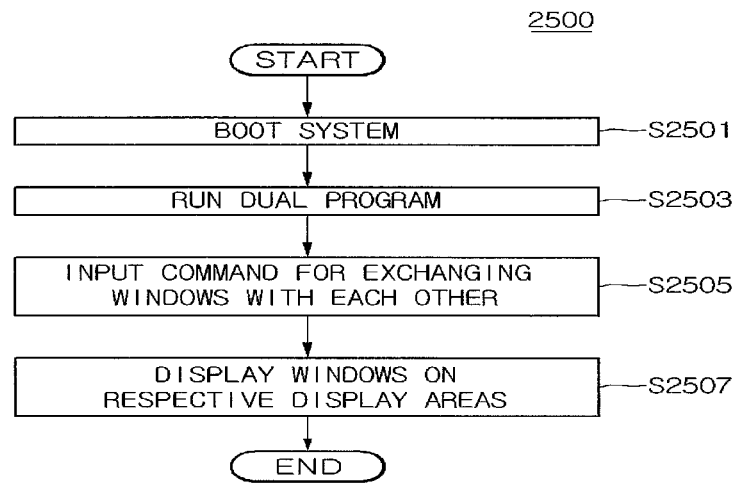
FIG. 25 is a flowchart illustrating an exchange of windows between one display area and another display area.

FIG. 25 illustrates an example process 2500 of an exchange of windows between one display area and another display area.

Referring to FIG. 25, in operations S2501 and S2503, a system is booted, and a dual program stored in a memory is loaded and executed.

In operations S2505 and S2507, foreground windows of the respective display areas may be exchanged with each other, and may be displayed on different display areas from each other through display of the menu screen or input of a predetermined specific key, and arranged on the different display area as a foreground screen.

In this case, the respective exchanged windows may be displayed in the full size of the respective exchanged display areas.

Figure 26:
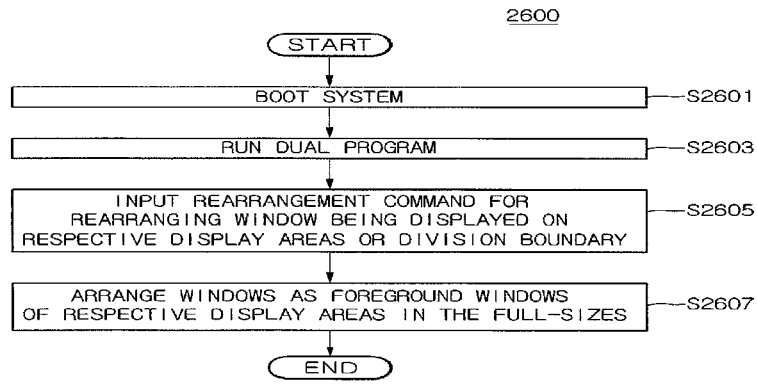
FIG. 26 is a flowchart illustrating a rearrangement of windows on respective display areas.

FIG. 26 illustrates an example process 2600 of a rearrangement of windows on respective display areas.

Referring to FIG. 26, in operations S2601 and S2603, a system is booted, and a dual program stored in a memory is loaded and executed.

In operations S2605 and S2607, windows that are being arranged on respective display areas or a division boundary may be arranged as foreground windows of the respective display areas in the full sizes through display of the menu screen or input of a predetermined specific key, and arranged on the different display area as a foreground screen.

In this case, only the foreground windows among all windows that are being arranged on the respective display areas may be rearranged in the full sizes of the respective display areas, or all windows may be rearranged according to a rearrangement command.

According to the rearrange command, the window that is being arranged over the division boundary may be rearranged in the full size on an image area over which the window is more superimposed based on the division boundary.

As described above, this present disclosure relates to an apparatus and a method for dividing an output display area of a display device to use.

More specifically, a display screen of a display device operationally connected to a main device is divided into a plurality of output display areas (hereinafter, referred to as display areas) by operation of a dual program. The display screen is divided at a predetermined ratio by a user, and the divided display areas may be variably adjusted by drag & drop at a division boundary.

Also, the windows in the respective display areas may be variably adjusted by drag & drop.

The windows displayed on the respective divided display areas may be basically displayed on display areas (left or right) that are configured in the menu "Position" of a menu screen by a user. The display area and the window may be adjusted or moved to another display area by control and command of a user.

Windows according to execution of various application programs (for example, MS Word or Power Point) including Internet programs may be displayed on the respective divided display areas.

Also, various image information based on display information (for example, position of a display area to be displayed and display area to be displayed (e.g., foreground)) preset by a user may be displayed on corresponding divided display areas.

The dual program may be programmed as an executable form by a computer, and be provided in a state being stored in a computer readable medium. The dual program may be installed on the computer systems 100 and 200.

The windows displayed on the respective display areas may be controlled to be displayed in the full sizes of the corresponding display areas under any display conditions by a controller.

Based on the features of the implementations, a display screen of a display device may be divided into a plurality of image areas at a predetermined division ratio, thereby enabling a plurality of operating windows to be displayed on one display screen. Also, a division boundary of the divided display areas may easily be adjusted in a right or left direction through drag & drop. Also, when the display area is divided vertically, a division boundary the vertically divided display areas may be adjusted in a vertical direction.

According to the implementations, windows in the respective display areas may also be adjusted by drag & drop.

Although respective windows are configured to be continuously displayed on positions of display areas selected by a user among a plurality of divided display areas, the windows may be displayed according to various configurations regardless of the positions of the display areas selected by the user.

For example, the windows may be alternately displayed on positions of the display areas (right or left) preset by a user. When the sizes of the divided display areas are different from each other, the window may be preferentially displayed on a greater divided display area or a more superimposed display area.

Among windows displayed on respective display areas, foreground windows displayed on the uppermost layers of the respective display areas may be the latest displayed windows of the respective display areas, thereby improving convenience of a user.

Also, the windows that are being displayed on the respective display areas may be moved to and displayed on another display area using a menu screen, a predetermined key, or a direction key (← or →). In this case, the moved windows may be automatically displayed as foreground windows in the full sizes of corresponding display areas.

According to the implementations, foreground windows that are being displayed on respective display area may be exchanged with each other using an exchange key (⇆) or a predetermined key. In this case, the exchanged windows may be automatically displayed as foreground window in the full sizes of corresponding display areas.

According to the implementations, when a dual program is run, and a plurality of windows are arranged, the latest displayed windows of respective display screens may be set as foreground windows, and be displayed in the full sizes.

In some implementations, the system may automatically select which area to rearrange a foreground window (e.g., a popup window) to when a user enters a rearrange window input command (e.g., double clicks on the popup window). In these implementations, the system may use a combination of one or more factors to perform the automatic selection. The factors may include which previously-displayed window the user selected the link to display the popup window (e.g., select the other display area to add the popup window), which display area the user was interacting with most recently (e.g., select the other area), whether one display area may be more appropriate than the other display area (e.g., because of size), etc. User preference settings may be used to weight these factors or determine which factors to consider in making an automatic selection.

In some examples, the system may automatically modify size (e.g., widths) of the display areas based on a size (e.g., width) of a window being rearranged and added to a display area. For example, when first and second display areas occupy the same amount of display screen size, a relatively small window is displayed in the first display area, and a relatively large window is being added to the second display area, the system may automatically adjust the size of the first and second display areas to better accommodate the windows. In this example, the system may shrink the first display area in which the relatively small window is displayed and enlarge the second display area in which the relatively large window is being added.

When loading a new application that displays a new window, the system may intelligently select which display area to display the new window based on what was being displayed prior to the new application being loaded. The system may use a combination of one or more factors to perform the automatic selection. The factors may include which display area the user was interacting with most recently (e.g., select the other display area), whether one display area may be more appropriate than the other display area (e.g., because of size), etc. User preference settings may be used to weight these factors or determine which factors to consider in making an automatic selection.

In performing an exchange operation, the system may resize the exchanged windows to fit into the display areas. In some implementations, the system may determine to hide a portion of a window when exchanging and resizing the window (e.g., the resizing may not be a direct shrink of the window to fit into the other side). In these implementations, the system may intelligently select which portion to hide. For instance, consider a relatively wide web page that is currently displayed with a side column that includes advertising content. When the relatively wide web page is being moved to a relatively narrow display area, the system may identify the side column as being advertising content and determine to hide the side column to make room for larger display of the primary content of the web page. When the web page is moved back to a relatively wide display area after the side column has been hidden, the system may determine to redisplay the side column because the size of the relatively wide display area allows for adequate display of the primary content and the side column.

In some examples, the techniques described throughout this disclosure may be applied to an interactive television context. In these examples, the display areas may display video television programs and/or display other interactive content, such as still images or web page content.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying a plurality of windows, comprising:

dividing a display screen into a first display area and a second display area;

displaying a first window on the first display area, wherein the size of the first window is less than the full size of the first display area;

displaying a second window on the second display area, wherein the size of the second window is less than the full size of the second display area;

displaying a third window in a foreground on the first window on a portion of the first display area and on the second window on a portion of the second display area;

receiving an input signal including at least one of a first hot key and a first direction key to rearrange the first window, the second window, and the third window when the third window is displayed in the foreground on the first window on the portion of the first display area and on the second window on the portion of the second display area;

when the first display area and the second display area are the same size:

determining whether the portion of the first display area over which the third window is displayed is greater than the portion of the second display area over which the third window is displayed in response to the input signal;

in response to the determination that the portion of the first display area over which the third window is displayed is greater than the portion of the second display area over which the third window is displayed, arranging the first window on the first display area in the full size of the first display area then arranging the third window as a foreground image on the first display area in the full size of the first display area;

and in response to the determination that the portion of the second display area over which the third window is displayed is greater than the portion of the first display area over which the third window is displayed, arranging the first window on the second display area in the full size of the second display area then arranging the third window as a foreground image on the second display area in the full size of the second display area, wherein the third window is the latest displayed window among the first window, the second window, and the third window.

2. The method of claim 1, wherein the first display area and the second display area are divided by a division boundary.

3. The method of claim 1, wherein the first display area and the second display area are divided into a left and a right of the display screen, and the third window overlaps the first window or the second window in the full size of the first display area or the full size of the second display area.

4. The method of claim 1, wherein the third window overlaps the first and the second windows prior to being displayed in the first display area or the second display area.

5. The method of claim 1, wherein displaying the first window comprises:

verifying a position of the first window that is being displayed on the display screen; and displaying the first window on the first display area using the position of the first window.

6. The method of claim 1, further comprising: exchanging the first window and the second window in response to input of an exchange key including at least one of a second hot key and a second direction key, the exchanging including displaying the first window on the second display area and displaying the second window on the first display area.

7. A method for controlling a display device, comprising:

loading and executing a dual program stored in a memory;

dividing a display screen into a first display area and a second display area;

displaying a first window on the first display area, wherein the size of the first window is less than the full size of the first display area;

receiving a first input signal to display a second window;

in response to the first input signal, determining that the first window is displayed on the first display area and that no window is displayed on the second display area;

in response to the determination that the first window is displayed on the first display area and that no window is displayed on the second display area, determining to display the second window on the second display area;

in response to the determination to display the second window on the second display area, displaying the second window on the second display area, wherein the size of the second window is less than the full size of the second display area;

exchanging position between the first window and the second widow in accordance with an input of an exchange key including at least one of a first hot key and a first direction key, the exchanging including displaying the first window on the second display area and displaying the second window on the first display area;

displaying a third window on the second display area according a second input signal when the first window is displayed on the second display area and the second window is displayed on the first display area, wherein the size of the third window is less than the full size of the second display area;

receiving a third input signal including at least one of a second hot key and a second direction key to rearrange the first window, the second window, and the third window; and in response to the third input signal including at least one of the second hot key and the second direction key to rearrange the first window, the second window, and the third window, arranging the first window on the second display area in the full size of the second display area then arranging the third window as a foreground image on the second display area in the full size of the second display area, and arranging the second window as a foreground image on the first display area in the full size of the first display area, wherein the third window is the latest displayed window among the first window, the second window, and the third window.

8. The method of claim 7, further comprising:

inputting on/off operation of the dual program by using menu screen information.

9. The method of claim 7, further comprising:

receiving a fourth input signal to rearrange display windows when the third window is displayed in the foreground on the first window on the portion of the first display area and on the second window on the portion of the second display area;

determining whether the portion of the first area over which the third window is displayed is greater than the portion of the second area over which the third window is displayed in response to the fourth input signal;

in response to a determination that the portion of the first area over which the third window is displayed is greater than the portion of the second area over which the third window is displayed, arranging the third window on the first window on the first display area; and in response to a determination that the portion of the second area over which the third window is displayed is greater than the portion of the first area over which the third window is displayed, arranging the third window on the second window on the second display area.

10. The method of claim 7, wherein the first and second display areas are divided by a division boundary.

11. A method for displaying a plurality of windows, comprising:

dividing a display screen into a first display area and a second display area;

displaying a first window on the first display area, wherein the size of the first window is less than the full size of the first display area;

displaying a second window on the second display area, wherein the size of the second window is less than the full size of the second display area;

displaying a third window in a foreground on the second window on a portion of the first display area and on a portion of the second display area;

receiving a first input signal including at least one of a hot key and a direction key to rearrange at least the first window, the second window, and the third window when the third window is displayed in the foreground over the portion of the first display area and the portion of the second display area;

in response to the first input signal, determining whether the portion of the first display area over which the third window is displayed is greater than the portion of the second display area over which the third window is displayed;

and in response to the determining, arranging the first window as a foreground image on the first display area in the full size of the first display area, arranging the second window on the second display area in the full size of the second display area then arranging the third window as a foreground image on the second display area in the full size of the second display area if the portion of the second display area over which the third window is displayed is greater than the portion of the first display area over which the third window is displayed, and arranging the third window as a foreground image on the first display area in the full size of the first display area if the portion of the first display area over which the third window is displayed is greater than the portion of the second display area over which the third window is displayed, wherein the third window is the latest displayed window among the first window, the second window, and the third window.

12. The method of claim 11, wherein displaying the third window in a foreground on the second window on a portion of the first display area and on a portion of the second display area further comprises displaying the third window in a foreground relative to a fourth window that is positioned on the second window on a portion of the second display area and that is partially covered by the third window, wherein the first input signal to rearrange the first window, the second window, and the third window further comprises:

arranging the fourth window on the second display area in the full size of the second display area before the third window is arranged as a foreground image on the second display area in the full size of the second display area.

13. The method of claim 11, further comprising: receiving a command to close the third window when the third window is arranged as a foreground image on the second display area in the full size of the second display area; and based on the command to close the third window, arranging the second window as a foreground image on the second display area in the full size of the second display area.

14. The method of claim 11, further comprising:

receiving a second input signal including at least one of the hot key and the direction key to rearrange the first window, the second window, and the third window when no window is arranged on the first display area in the full size of the first display area, no window is arranged on the second display area in the full size of the second display area, the first window is displayed in the foreground over a portion of the first display area, the third window is displayed in the foreground over a portion of the second display area, and the second window is displayed over a portion of the second display area and partially covered by the third window; and in response to the second input signal, arranging the first window as a foreground image on the first display area in the full size of the first display area, arranging the second window on the second display area in full size then arranging the third window as a foreground image on the second display area in the full size of the second display area.

15. The method of claim 11, further comprising:

receiving a second input signal including at least one of the hot key and the direction key to rearrange the first window and the second window when no window is arranged on the first display area, no window is arranged on the second display area in the full size of the second display area, the first window is displayed in the foreground over a portion of the second display area, and the second window is displayed over a portion of the second display area and partially covered by the first window; and in response to the second input signal, arranging the second window on the second display area in the full size of the second display area then arranging the first window as a foreground image on the second display area in the full size of the second display area, and maintaining the first display area with no window arranged on the first display area.

* * * * *